(No Model.) 2 Sheets—Sheet 2.
F. F. METZGER.
CENTRIFUGAL MACHINE.
No. 572,121. Patented Dec. 1, 1896.
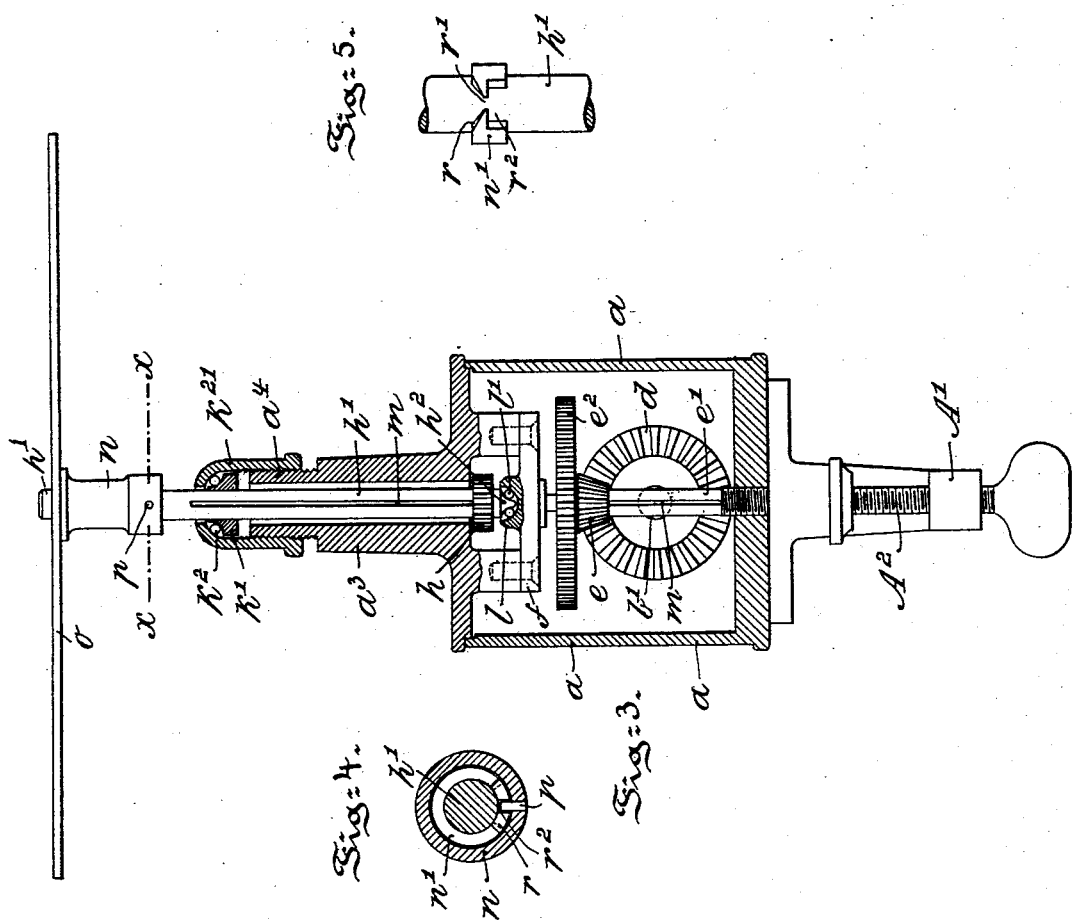
Witnesses:
Thomas M. Smith
Richard E. Maxwell
Inventor:
Ferdinand F. Metzger,
by J. Walter Douglas
Attorney

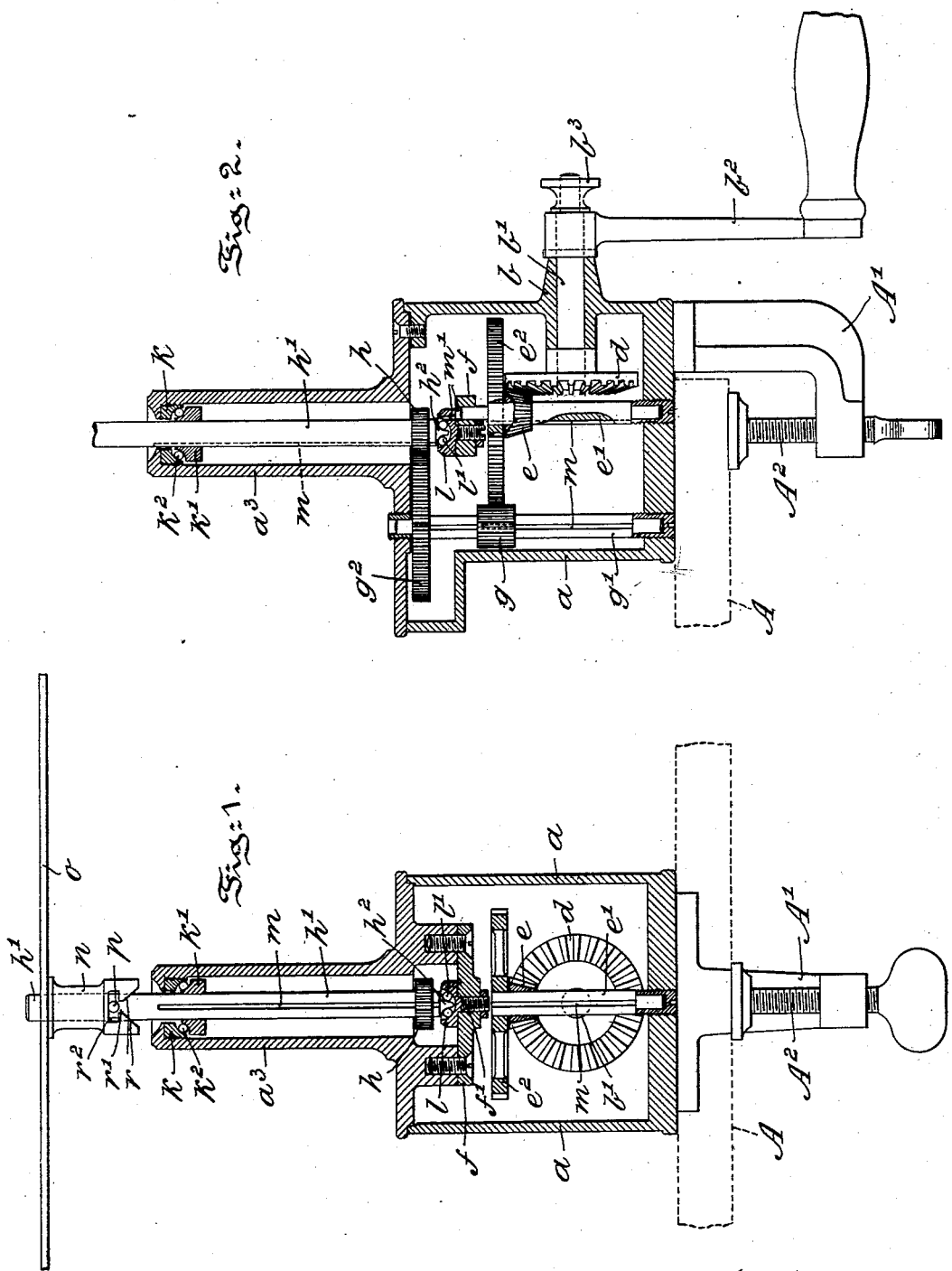

UNITED STATES PATENT OFFICE.

FERDINAND F. METZGER, OF PHILADELPHIA, PENNSYLVANIA.

CENTRIFUGAL MACHINE.

SPECIFICATION forming part of Letters Patent No. 572,121, dated December 1, 1896.

Application filed January 23, 1896. Serial No. 576,529. (No model.)

*To all whom it may concern:*

Be it known that I, FERDINAND F. METZGER, a citizen of the United States, residing at the city of Philadelphia, in the county of Philadelphia and State of Pennsylvania, have invented certain new and useful Improvements in Centrifugal Machines, of which the following is a specification.

My invention has relation to a centrifugal machine for the rapid and accurate examination of blood, sputum, urine, and the like, or for the precipitation of solid bodies of different specific gravities contained in fluids; and it relates more particularly to the construction and arrangement of such a machine for said purposes.

The principal objects of my invention are, first, to provide a simple, comparatively inexpensive, and efficient centrifugal machine or apparatus for volumetric analysis and generally for bacteriological, chemical, or physiological research; second, to provide a centrifugal machine adapted to be operated, manually or otherwise, at a high rate of speed, the friction on the working parts of the driven shaft of the machine being reduced to a minimum and a constant lubrication of the bearings of the shaft being readily accomplished; third, to provide in such a machine a driven shaft supported near its upper and lower ends by ball or roller bearings and provided with means for increasing or decreasing the tension of the bearings upon the shaft; fourth, to provide in such a machine driven and main gear shafts that rotate in bearings in a substantially vertical plane, and each of these shafts provided with a vertical groove adapted to conduct or feed a lubricant to the bearings of these shafts; fifth, to provide in such a machine a bayonet connection of improved form, whereby the driven shaft and the head carrying a test-tube may be quickly and readily connected to and disconnected from the shaft; sixth, to provide in such a machine a test-tube holder having a head with a flaring opening and a transverse recess adapted by gravity to engage a pin of the driven shaft of the machine and thereby to firmly support to position said holder during actuation thereof, and, seventh, to provide in such a machine a driven shaft supported in adjustable roller or ball bearings for compensating for wear thereof and to reduce friction in the actuation of the said shaft to a minimum.

My invention, stated in general terms, consists of a centrifugal machine constructed and arranged for operation in substantially the manner hereinafter described and claimed.

The nature and scope of my invention will be more fully understood from the following description, taken in connection with the accompanying drawings, forming part hereof, in which—

Figure 1 is a longitudinal sectional view of a centrifugal machine embodying the main features of my invention. Fig. 2 is a transverse sectional view of the same. Fig. 3 is a longitudinal sectional view of a modified form of the machine, illustrating a modified form of tension device for the ball-bearing and driven shaft and also a modified form of bayonet connection between the driven shaft and the head carrying the test-tube holder. Fig. 4 is a transverse section enlarged on the line $x\,x$ of Fig. 3; and Fig. 5 is an enlarged front elevation in broken section, illustrating in detail the driven shaft and the collar secured thereto and forming one of the members of the bayonet connection illustrated in Fig. 3.

Referring to the drawings, $a$ represents the main casing or housing of the machine and is of substantially cylindric form. This casing $a$ is secured to a table or support A by means of the bracket A' and tightening screw or clamp $A^2$, substantially as shown in Figs. 1 and 2. On one side of the periphery of the casing is formed a sleeve or bearing $b$, in which is supported a shaft $b'$, arranged in substantially a horizontal plane. Secured in any well-known manner to the outer end of this shaft $b'$ is a handle or crank $b^2$, which, as shown in the drawings, is preferably held on the shaft $b'$ against lateral displacement by means of a jam-nut $b^3$. The shaft $b'$ extends within the casing $a$ and carries at its inner end a miter-gear $d$, meshing with a miter-gear $e$, secured to a shaft $e'$, arranged in a substantially vertical plane in the casing $a$. The lower end of this shaft $e'$ has a bearing in the lower floor of the casing $a$, and its upper end has a bearing preferably in a bracket $f$, depending from the upper floor of said casing. The shaft $e'$ carries a gear-wheel $e^2$, meshing with a pinion $g$, secured to a shaft $g'$, arranged in a substantially vertical plane, the lower end of said shaft $g'$ having a bearing in the lower floor of the casing $a$, and the upper end of said shaft having its bearing preferably in the upper floor or cover of the casing. This shaft $g'$ carries a gear-wheel $g^2$, which meshes with a pinion $h$, secured at or near the lower end of the driven shaft $h'$, which is arranged in a substantially vertical plane. This shaft $h'$ rotates within an upward cylindrical extension or sleeve $a^3$ of the casing $a$.

At the upper end of the sleeve or extension $a^3$ and preferably screwed into the interior thereof, as shown in Figs. 1 and 2, is mounted an inverted-cup-shaped bearing-piece $k$, through which the shaft $h'$ extends and fitting down over a cup-shaped collar $k'$, secured to the shaft $h'$. Between the piece $k$ and collar $k'$ are located balls $k^2$ to thus form at the upper end of the shaft $h'$ a roller or ball bearing for said shaft. The lower end of the shaft $h'$ is substantially conical, as at $h^2$, and fits down into a cup-shaped bearing $l$, adjustably supported in the bracket $f$, the adjustment being accomplished by means of a set-screw $f'$, which, when advanced in the bracket $f$, bears against the bearing $l$, thus raising the same and thereby elevating the shaft $h'$ to increase the tension upon the ball or roller bearing at its upper end. Between the bearing $l$ and the end of the shaft $h'$ are located a series of balls $l'$ to constitute a roller or ball bearing for the lower end of said shaft.

In Fig. 3 is shown a modified form of this tension device, which is arranged as follows: At the upper end of the sleeve or extension $a^3$ is formed a screw-threaded portion $a^4$, and upon this portion $a^4$ a thimble or cap $k^{31}$ is adapted to be advanced and retracted. The balls $k^2$ are placed between this cap $k^{31}$ and the collar $k'$ of the shaft $h'$. In this modification the lower end of the shaft $h'$ may either rest, as shown in Figs. 1 and 2, upon an adjustable ball-bearing or upon a fixed ball-bearing supported upon the bracket $f$, as shown in Fig. 3. To lubricate the bearings of the three vertical shafts $e'$, $g'$, and $h'$ there is formed in each of them a vertical groove $m$, extending from the upper to the lower bearing of each shaft. In the drawings the groove $m$ of the shaft $h'$ begins at the top above the sleeve or extension $a^3$ and terminates at the lower ball or roller bearing for said shaft. In the shaft $e'$ the upper end of the groove $m$ is continued through the bracket $f$ by a short duct $m'$, which terminates in the lower ball or roller bearing of the shaft $h'$. By this arrangement oil entering the groove $m$ at the top of the shaft $h'$ will by gravity descend to the lower ball or roller bearing of said shaft and from thence enter the upper bearing of the shaft $e'$ and the groove of the shaft $e'$, through which it passes to lubricate both the upper and lower bearings thereof. To the upper end of the shaft $h'$ is secured by a bayonet connection a head $n$, which carries a test-tube holder $o$. In Figs. 1 and 2 this bayonet connection is formed in the following manner: The shaft $h'$ carries a pin $p$, and the interior of the head $n$ is cut out first into a triangular recess $r$, terminating in a straight vertical recess $r'$, slightly wider than the pin $p$. This recess $r'$ communicates in a horizontal slot $r^2$ of approximately the same width as the recess $r'$. The triangular recess $r$ serves as a guide to conduct the pin $p$ to the recess $r'$, it being obvious that when the head is slipped over the end of the shaft $h'$ and slightly turned until the pin $p$ comes into alinement with the mouth of the triangular recess the pin will be guided along either side of said triangular recess until it enters the straight recess in the head. When the pin is in alinement with this straight recess, the head will readily slip down by gravity until the pin is in alinement with the horizontal recess $r^2$, when by turning the head slightly the shaft and head are locked together.

In Figs. 3, 4, and 5 the construction is slightly modified in that on the shaft $h'$ a collar $n'$ is provided which corresponds with the interior of the head $n$, and in this collar $n'$ is formed a triangular recess $r$, a vertical recess $r'$, and a horizontal slot $r^2$, the head $o$ carrying on its interior a locking-pin $p$.

Having thus described the nature and objects of my invention, what I claim as new, and desire to secure by Letters Patent, is—

1. In a centrifugal machine, a casing having an extension, a dished bearing-piece secured at the upper end of said extension, a driven shaft having a conical lower end and extending through said bearing-piece and rotating therein, a collar secured to the upper end of said shaft beneath said upper bearing-piece, balls interposed between said collar and bearing-piece, a bracket supported within said casing and below said driven shaft, a dished bearing-piece supported in said bracket, balls interposed between the conical end of said shaft and the lower dished bearing-piece and means for advancing said bearing-piece in said bracket to thereby adjust the tension of said lower bearing against the end of said driven shaft, substantially as and for the purposes described.

2. In a centrifugal machine, a driven shaft, a main gear-shaft located in a vertical plane and substantially out of alinement with the lower bearing of said driven shaft, each of said shafts being provided with a vertical groove, and a duct leading from the lower bearing of the driven shaft to the upper bearing of the gear-shaft, whereby said grooves and duct constitute a continuous lubricating-channel for the bearings of said shafts, substantially as and for the purposes described.

3. In a centrifugal machine, a driven shaft, means for rotating the same, a head carrying a test-tube holder and a bayonet connection between said head and shaft members and consisting of a pin carried by one of said members the other member having a triangular recess merging into a vertical recess and terminating in a horizontal slot, substantially as and for the purposes described.

In testimony whereof I have hereunto set my signature in the presence of two subscribing witnesses.

FERDINAND F. METZGER.

Witnesses:
 THOMAS M. SMITH,
 RICHARD C. MAXWELL.